US011138595B2

(12) United States Patent
Kurien et al.

(10) Patent No.: US 11,138,595 B2
(45) Date of Patent: Oct. 5, 2021

(54) SYSTEM, METHOD, AND COMPUTER PROGRAM PRODUCT FOR MAINTAINING TRANSACTION INTEGRITY OVER PUBLIC NETWORKS

(71) Applicant: Visa International Service Association, San Francisco, CA (US)

(72) Inventors: Libby A. Kurien, Santa Clara, CA (US); Glenn Powell, Fremont, CA (US); Murali Krishnan Sreenivasan, Pleasanton, CA (US); Anand Pandya, Washington, DC (US); Bishenjit Paul Choudhury, Austin, TX (US); David Tseselsky, San Jose, CA (US); Galileo Olmos, Belmont, CA (US)

(73) Assignee: Visa International Service Association, San Francisco, CA (US)

( * ) Notice: Subject to any disclaimer, the term of this patent is extended or adjusted under 35 U.S.C. 154(b) by 0 days.

(21) Appl. No.: 16/615,581

(22) PCT Filed: May 30, 2017

(86) PCT No.: PCT/US2017/034993
§ 371 (c)(1),
(2) Date: Nov. 21, 2019

(87) PCT Pub. No.: WO2018/222171
PCT Pub. Date: Dec. 6, 2018

(65) Prior Publication Data
US 2020/0090165 A1  Mar. 19, 2020

(51) Int. Cl.
*G06Q 20/38* (2012.01)
*G06Q 20/10* (2012.01)
(Continued)

(52) U.S. Cl.
CPC ......... *G06Q 20/382* (2013.01); *G06Q 20/10* (2013.01); *G06Q 20/202* (2013.01); *G06Q 20/204* (2013.01); *H04W 12/106* (2021.01)

(58) Field of Classification Search
CPC .... G06Q 20/10; G06Q 20/202; G06Q 20/204; G06Q 20/382; H04W 12/1006
(Continued)

(56) References Cited

U.S. PATENT DOCUMENTS 7,720,763 B2 * 5/2010 Campbell .............. G06Q 20/40
705/44
8,135,647 B2 * 3/2012 Hammad .............. H04L 9/3271
705/67
(Continued)

OTHER PUBLICATIONS

Kuttnner et al., "Personal On-Line Payments", FRBNY Economic Policy Review, Dec. 2001.*

*Primary Examiner* — Frantzy Poinvil
(74) *Attorney, Agent, or Firm* — The Webb Law Firm

(57) ABSTRACT

A method for maintaining transaction integrity for transactions performed over a public network includes: receiving a transaction message corresponding to an original transaction, the transaction message including a unique, client-assigned, first identifier; in response to receiving the transaction message, assigning a unique, second identifier to the original transaction; generating a request to process the original transaction including at least a portion of the transaction message and the second identifier; transmitting the request to an issuer server to process the original transaction; receiving a first response from the issuer server in connection with the original transaction; in response to the first response, generating a second response corresponding to the original transaction including the first identifier and the second identifier; and transmitting the second response to the client. A system and computer program (Continued)

product for maintaining transaction integrity for transactions performed over a public network is also disclosed.

19 Claims, 7 Drawing Sheets

(51) Int. Cl.
  *G06Q 20/20* (2012.01)
  *H04W 12/106* (2021.01)
(58) Field of Classification Search
  USPC .................................................. 705/3–44
  See application file for complete search history.

(56) References Cited

U.S. PATENT DOCUMENTS

| | | | | |
|---|---|---|---|---|
| 8,204,824 | B2 * | 6/2012 | Knowles | G06Q 20/04 705/38 |
| 8,612,348 | B1 * | 12/2013 | Gage | G06Q 20/12 705/40 |
| 8,732,080 | B2 * | 5/2014 | Karim | G06Q 20/10 705/42 |
| 8,762,275 | B2 * | 6/2014 | Martino | G06Q 20/40 705/44 |
| 9,195,984 | B1 | 11/2015 | Spector et al. | |
| 2006/0010070 | A1 | 1/2006 | Banaugh et al. | |
| 2009/0150287 | A1 * | 6/2009 | Campbell | G06Q 20/10 705/44 |
| 2013/0166402 | A1 * | 6/2013 | Parento | G06Q 20/227 705/21 |
| 2013/0218695 | A1 * | 8/2013 | Brooks | G06Q 20/20 705/17 |
| 2014/0188710 | A1 * | 7/2014 | Basu | G06Q 20/023 705/39 |
| 2015/0186864 | A1 * | 7/2015 | Jones | G06Q 20/326 705/39 |
| 2015/0339667 | A1 * | 11/2015 | Dua | G06Q 20/3674 705/16 |
| 2018/0025396 | A1 * | 1/2018 | Roberts | G06Q 20/047 705/39 |

* cited by examiner

SYSTEM, METHOD, AND COMPUTER PROGRAM PRODUCT FOR MAINTAINING TRANSACTION INTEGRITY OVER PUBLIC NETWORKS

CROSS-REFERENCE TO RELATED APPLICATION

This application is the United States national phase of International Application No. PCT/US2017/034993 filed May 30, 2017, the disclosure of which is hereby incorporated by reference in its entirety.

BACKGROUND

Technical Field

This disclosure relates to transaction integrity and, in particular, to a system, method, and computer program product for maintaining transaction integrity for transactions performed over a public network.

Technical Considerations

Description of Related Art

After a transaction between a consumer and a merchant, details regarding the transaction are submitted in an original message to a transaction service provider to be correctly authorized, cleared, and settled, while maintaining transaction integrity. The transaction service provider is also responsible for managing the lifecycle of each particular transaction submitted, which may include follow-on messages to the original message. These follow-on messages must also be correctly matched, logged, and retained to maintain transaction integrity.

Currently, transactions submitted to transaction service providers are transmitted over private networks, in order to securely maintain transaction integrity. In submitting the original message to the transaction service provider in the form of a transaction message, the client (such as a point-of-sale system, merchant, acquirer, payment facilitator, or the like) submits the transaction information. The transaction service provider processes the transaction message and generates and responds with a unique identifier by which the client can refer to the transaction to follow-up with the transaction service provider. However, in the cases in which the transaction service provider fails to send back a unique identifier before a follow-on message is required, the client is left without a reference for follow-up activity. Further, for each transaction submitted to the transaction service provider, the client must include a full specification of information in the transaction message, much of which can be redundant. Any information missing from this full specification can result in the transaction submission being bounced back to the client.

In order to transport a transaction message to a transaction service provider, current solutions require an access device, such as a server or router, to effectuate secure communications between a client and a transaction service provider. Such physical systems often need to continually or periodically communicate with the transaction service provider to report its status and require clients to invest in physical payment processing infrastructure in order to accept payments.

Therefore, there is a need in the art to provide a new, improved payment processing network and architecture for clients to securely submit transactions to a transaction service provider.

SUMMARY

Accordingly, provided is an improved system, method, and computer program product for maintaining transaction integrity for transactions performed over a public network that overcomes some or all of the deficiencies of the prior art.

According to some non-limiting embodiments or aspects provided is a method of maintaining transaction integrity for transactions performed over a public network. The method includes: (i) receiving, from a client device, a transaction message corresponding to an original transaction, the transaction message including a unique, client-assigned, first identifier; (ii) in response to receiving the transaction message, assigning a unique, second identifier to the original transaction; (iii) generating a request to process the original transaction including at least a portion of the transaction message and the second identifier; (iv) transmitting the request to an issuer server to process the original transaction; (v) receiving a first response from the issuer server in connection with the original transaction; (vi) in response to the first response, generating a second response corresponding to the original transaction, the second response including the first identifier and the second identifier; and (vii) transmitting the second response to the client device.

According to some non-limiting embodiments or aspects, provided is a system for maintaining transaction integrity for transactions performed over a public network, including at least one server computer including at least one processor. The at least one server computer is programmed and/or configured to: (i) receive, from a client device, a transaction message corresponding to an original transaction, the transaction message including a unique, client-assigned, first identifier; (ii) in response to receiving the transaction message, assign a unique, second identifier to the original transaction; (iii) generate a request to process the original transaction including at least a portion of the transaction message and the second identifier; (iv) transmit the request to an issuer server to process the original transaction; (v) receive a first response from the issuer server in connection with the original transaction; (vi) in response to the first response, generate a second response corresponding to the original transaction including the first identifier and the second identifier; and (vii) transmit the second response to the client device.

According to some non-limiting embodiments or aspects, provided is a method of maintaining transaction integrity for transactions performed over a public network. The method includes: (i) receiving, from a client device, a transaction message corresponding to an original transaction via a public internet connection, the transaction message including a unique, client-assigned, first identifier; (ii) generating a request to process the original transaction including at least a portion of the transaction message; (iii) transmitting the request to an issuer server to process the original transaction; (iv) receiving a first response from the issuer server corresponding to the original transaction; (v) in response to receiving the first response, generating a second response corresponding to the original transaction including the first identifier; and (vi) transmitting the second response to the client device via the public internet connection.

According to some non-limiting embodiments or aspects provided is a computer program product for maintaining transaction integrity for transactions performed over a public network, including at least one non-transitory computer-readable medium including program instructions that, when executed by at least one processor, cause the at least one processor to: receive, from a client device, a transaction message corresponding to an original transaction, the transaction message including a unique, client-assigned, first identifier; in response to receiving the transaction message, assign a unique, second identifier to the original transaction; generate a request to process the original transaction including at least a portion of the transaction message and the second identifier; transmit the request to an issuer server to process the original transaction; receive a first response from the issuer server in connection with the original transaction; in response to the first response, generate a second response corresponding to the original transaction comprising the first identifier and the second identifier; and transmit the second response to the client device.

Further non-limiting embodiments or aspects are set forth in the following numbered clauses:

Clause 1: A method of maintaining transaction integrity for transactions performed over a public network, comprising: receiving, from a client device, a transaction message corresponding to an original transaction, the transaction message comprising a unique, client-assigned, first identifier; in response to receiving the transaction message, assigning a unique, second identifier to the original transaction; generating a request to process the original transaction comprising at least a portion of the transaction message and the second identifier; transmitting the request to an issuer server to process the original transaction; receiving a first response from the issuer server in connection with the original transaction; in response to the first response, generating a second response corresponding to the original transaction, the second response comprising the first identifier and the second identifier; and transmitting the second response to the client device.

Clause 2: The method of clause 1, wherein after receiving the first response, a unique, third identifier is assigned and included in the second response.

Clause 3: The method of clause 1 or 2, further comprising: storing data associated with the client device or a merchant or acquirer associated with the client device; and augmenting the transaction message with the stored data associated with the client device or the merchant associated with the client device.

Clause 4: The method of any of clauses 1-3, further comprising: receiving a follow-on message from the client device, the follow-on message comprising the first identifier; and associating the follow-on message with the original transaction.

Clause 5: The method of any of clauses 1-4, wherein the transaction message is received via a public internet connection.

Clause 6: The method of any of clauses 1-5, wherein the first identifier is generated by the client device.

Clause 7: The method of any of clauses 1-6, wherein a plurality of transaction messages are received from the client device, wherein each of the plurality of transaction messages comprises a first identifier, and wherein the first identifier of each transaction message is different from the first identifier of the other transaction messages.

Clause 8: The method of any of clauses 1-7, wherein the follow-on message comprises at least one of a reversal message and a completion message.

Clause 9: The method of any of clauses 1-8, wherein each response generated and transmitted to the client device corresponding to the original transaction comprises the first identifier contained in the transaction message corresponding to the original transaction.

Clause 10: The method of any of clauses 1-9, wherein the follow-on message is received and associated with the original transaction before or after the second response is transmitted to the client device.

Clause 11: A system for maintaining transaction integrity for transactions performed over a public network, comprising at least one server computer including at least one processor, the at least one server computer programmed and/or configured to: receive, from a client device, a transaction message corresponding to an original transaction, the transaction message comprising a unique, client-assigned, first identifier; in response to receiving the transaction message, assign a unique, second identifier to the original transaction; generate a request to process the original transaction comprising at least a portion of the transaction message and the second identifier; transmit the request to an issuer server to process the original transaction; receive a first response from the issuer server in connection with the original transaction; in response to the first response, generate a second response corresponding to the original transaction comprising the first identifier and the second identifier; and transmit the second response to the client device.

Clause 12: The system of clause 11, wherein the at least one server computer is further programmed and/or configured to: after receiving the first response, assign a unique, third identifier and include the third identifier in the second response.

Clause 13: The system of clause 11 or 12, wherein the at least one server computer is further programmed and/or configured to: store data associated with the client device or a merchant or acquirer associated with the client device; and augment the transaction message with the stored data associated with the client device or the merchant associated with the client device.

Clause 14: The system of any of clauses 11-13, wherein the at least one server computer is further programmed and/or configured to: receive a follow-on message from the client device, the follow-on message comprising the first identifier; and associate the follow-on message with the original transaction.

Clause 15: The system of any of clauses 11-14, wherein the transaction message is received via a public internet connection.

Clause 16: The system of any of clauses 11-15, wherein the first identifier is generated by a client associated with the client device.

Clause 17: The system of any of clauses 11-16, wherein the at least one server computer is further programmed and/or configured to: receive a plurality of transaction messages from the client device, wherein each of the plurality of transaction messages comprises a first identifier, wherein the first identifier of each transaction message is different from the first identifier of the other transaction messages.

Clause 18: The system of any of clauses 11-17, wherein each response generated and transmitted to the client device corresponding to the original transaction comprises the first identifier contained in the transaction message corresponding to the original transaction.

Clause 19: The system of any of clauses 11-18, wherein the at least one server computer is further programmed and/or configured to receive and associate the follow-on message with the original transaction before or after the second response is transmitted to the client device.

Clause 20: A method of maintaining transaction integrity for transactions performed over a public network, comprising: receiving, from a client device, a transaction message corresponding to an original transaction via a public internet connection, the transaction message comprising a unique, client-assigned, first identifier; generating a request to process the original transaction comprising at least a portion of the transaction message; transmitting the request to an issuer server to process the original transaction; receiving a first response from the issuer server corresponding to the original transaction; in response to receiving the first response, generating a second response corresponding to the original transaction comprising the first identifier; and transmitting the second response to the client device via the public internet connection.

Clause 21: The method of any of clauses 1-10 and 20, wherein the client device comprises at least one of: an acquirer host computer, a merchant point-of-sale (POS) system, a computer, a portable computer, a tablet computer, a cellular phone, a wearable device, and/or a personal digital assistant (PDA).

Clause 22: The system of any of clauses 11-19, wherein the client device comprises at least one of: an acquirer host computer, a merchant point-of-sale (POS) system, a computer, a portable computer, a tablet computer, a cellular phone, a wearable device, and/or a personal digital assistant (PDA).

Clause 23: A computer program product for maintaining transaction integrity for transactions performed over a public network, comprising at least one non-transitory computer-readable medium including program instructions that, when executed by at least one processor, cause the at least one processor to: receive, from a client device, a transaction message corresponding to an original transaction, the transaction message comprising a unique, client-assigned, first identifier; in response to receiving the transaction message, assign a unique, second identifier to the original transaction; generate a request to process the original transaction comprising at least a portion of the transaction message and the second identifier; transmit the request to an issuer server to process the original transaction; receive a first response from the issuer server in connection with the original transaction; in response to the first response, generate a second response corresponding to the original transaction comprising the first identifier and the second identifier; and transmit the second response to the client device.

These and other features and characteristics of the present disclosure, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosure. As used in the specification and the claims, the singular form of "a," "an," and "the" include plural referents unless the context clearly dictates otherwise.

BRIEF DESCRIPTION OF THE DRAWINGS

Additional advantages and details of the disclosure are explained in greater detail below with reference to the exemplary embodiments that are illustrated in the accompanying schematic figures, in which.

DETAILED DESCRIPTION

Figure 1:
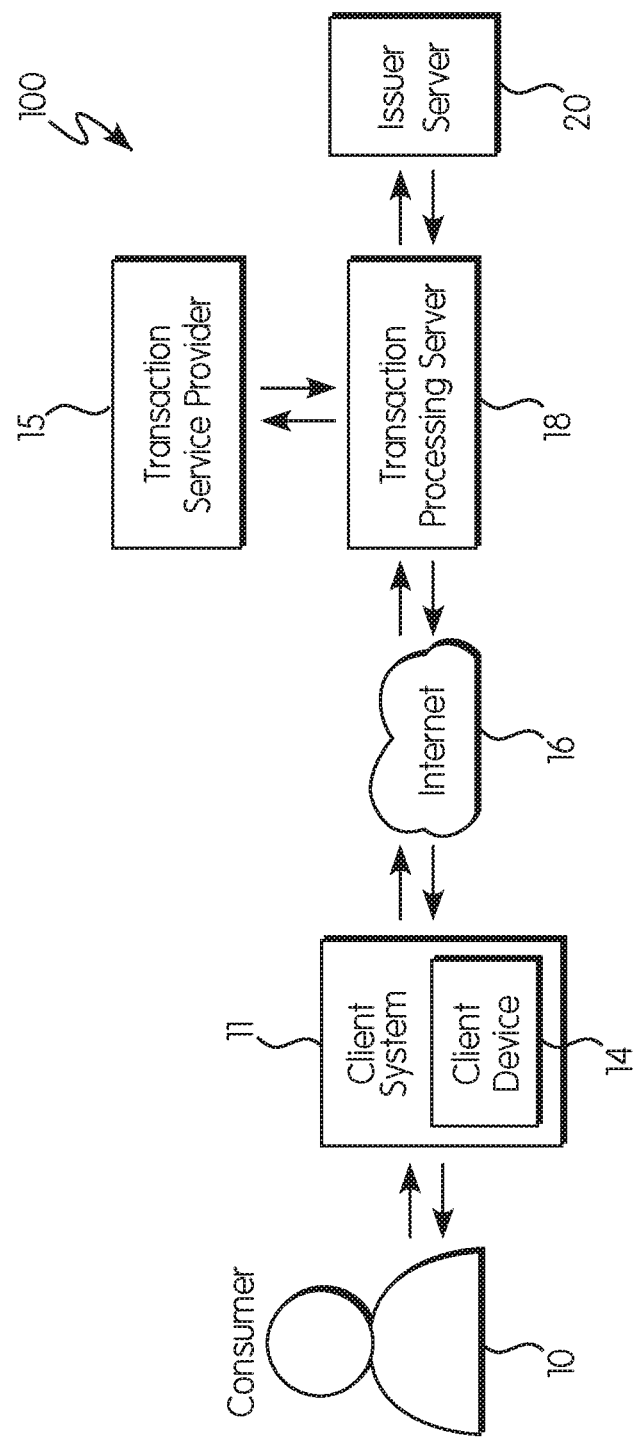
FIG. 1 is a schematic diagram of a non-limiting embodiment or aspect of a system for maintaining transaction integrity for transactions performed over a public network.

For purposes of the description hereinafter, the terms "end," "upper," "lower," "right," "left," "vertical," "horizontal," "top," "bottom," "lateral," "longitudinal," and derivatives thereof shall relate to the disclosure as it is oriented in the drawing figures. However, it is to be understood that the disclosure may assume various alternative variations and step sequences, except where expressly specified to the contrary. It is also to be understood that the specific devices and processes illustrated in the attached drawings, and described in the following specification, are simply exemplary embodiments or aspects of the disclosure. Hence, specific dimensions and other physical characteristics related to the embodiments or aspects disclosed herein are not to be considered as limiting.

As used herein, the terms "communication" and "communicate" refer to the receipt or transfer of one or more signals, messages, commands, or other type of data. For one unit (e.g., any device, system, or component thereof) to be in communication with another unit means that the one unit is able to directly or indirectly receive data from and/or transmit data to the other unit. This may refer to a direct or indirect connection that is wired and/or wireless in nature. Additionally, two units may be in communication with each other even though the data transmitted may be modified, processed, relayed, and/or routed between the first and second unit. For example, a first unit may be in communication with a second unit even though the first unit passively receives data and does not actively transmit data to the second unit. As another example, a first unit may be in communication with a second unit if an intermediary unit processes data from one unit and transmits processed data to the second unit. It will be appreciated that numerous other arrangements are possible.

As used herein, the terms "issuing institution," "portable financial device issuer," "issuer," or "issuer bank" may refer to one or more entities that provide accounts to customers for conducting payment transactions, such as initiating credit and/or debit payments. For example, an issuing institution may provide an account identifier, such as a personal account number (PAN), to a customer that uniquely identifies one or more accounts associated with that customer. The account identifier may be embodied on a portable financial device such as a physical financial instrument, e.g., a payment card, and/or may be electronic and used for electronic payments. As used herein, the term "account identifier" may include one or more PANs, tokens, or other identifiers associated with a customer account. The term "token" may refer to an identifier that is used as a substitute or replacement identifier for an original account identifier, such as a PAN. Account identifiers may be alphanumeric or any combination of characters and/or symbols. Tokens may be associated with a PAN or other original account identifier in one or more databases such that they may be used to conduct a transaction without directly using the original account identifier. In some examples, an original account identifier, such as a PAN, may be associated with a plurality of tokens for different individuals or purposes. An issuing institution may be associated with a bank identification number (BIN) that uniquely identifies it. The terms "issuing institution" and "issuing institution system" may also refer to one or more computer systems operated by or on behalf of an issuing institution, such as a server computer executing one or more software applications. For example, an issuing institution system may include one or more authorization servers for authorizing a payment transaction.

As used herein, the term "merchant" refers to an individual or entity that provides goods and/or services, or access to goods and/or services, to customers (also referred to herein interchangeably as a "consumer") based on a transaction, such as a payment transaction. "Merchant" may also refer to one or more computer systems operated by or on behalf of a merchant, such as a server computer executing one or more software applications. As used herein, a "merchant point-of-sale (POS) system" may refer to one or more computers and/or peripheral devices used by a merchant to engage in payment transactions with customers, including one or more card readers, near-field communication (NFC) receivers, RFID receivers, and/or other contactless transceivers or receivers, contact-based receivers, payment terminals, computers, servers, input devices, and/or other like devices that may be used to initiate a payment transaction. A merchant POS system may also include one or more server computers programmed or configured to process online payment transactions through webpages, mobile applications, and/or the like.

As used herein, the term "transaction service provider" may refer to an entity that receives transaction authorization requests from merchants or other entities and provides guarantees of payment, in some cases through an agreement between the transaction service provider and the issuing institution. The term "transaction service provider" may also refer to one or more computer systems operated by or on behalf of a transaction service provider, such as a transaction processing server executing one or more software applications. A transaction processing server may include one or more processors and, in some non-limiting embodiments or aspects, may be operated by or on behalf of a transaction service provider.

As used herein, the term "acquirer" may refer to an entity licensed by the transaction service provider and approved by the transaction service provider to originate transactions using a portable financial device of the transaction service provider. The transactions may include purchases, original credit transactions (OCTs), account funding transactions (AFTs), and other like payment transactions. The acquirer may be authorized by the transaction service provider to sign merchant or service providers to originate transactions using a portable financial device of the transaction service provider. The acquirer may contract with payment facilitators to enable the facilitators to sponsor merchants. The acquirer may monitor compliance of the payment facilitators in accordance with regulations of the transaction service provider. The acquirer may conduct due diligence of payment facilitators and ensure proper due diligence occurs before signing a sponsored merchant. Acquirers may be liable for all transaction service provider programs that they operate or sponsor. Acquirers may be responsible for the acts of its payment facilitators and the merchants it or its payment facilitators sponsor. An acquirer may be a financial institution, such as a bank.

As used herein, the term "portable financial device" may refer to a payment card (e.g., a credit or debit card), a gift card, a smartcard, smart media, a payroll card, a healthcare card, a wrist band, a machine-readable medium containing account information, a keychain device or fob, an RFID transponder, a retailer discount or loyalty card, a cellular phone, an electronic wallet application, a personal digital assistant, a pager, a security card, a computer, an access card, a wireless terminal, and/or a transponder, as examples. The portable financial device may include a volatile or a non-volatile memory to store information, such as an account identifier or a name of the account holder.

As used herein, the term "payment facilitator" may refer to a payment processing system operated by or on behalf of an entity that contracts with an acquirer to provide transaction service provider payment services using portable financial devices of the transaction service provider to merchants sponsored by the payment facilitator. A payment facilitator may also refer to the entity that operates such a payment processing system. The payment facilitator may monitor all of its sponsored merchant activity in accordance with regulations of the transaction service provider.

As used herein, the terms "client" and "client device" may refer to one or more client-side devices or systems, remote from a transaction service provider, used to initiate or facilitate a transaction. As an example, a "client device" may refer to one or more point-of-sale (POS) systems used by a merchant or an acquirer host computer used by an acquirer. It will be appreciated that a client device may be any electronic device configured to communicate with one or more networks and initiate or facilitate transaction such as, but not limited to, one or more computers, portable computers, tablet computers, cellular phones, wearable devices (e.g., watches, glasses, lenses, clothing, and/or the like), personal digital assistants (PDAs), and/or other like devices. Moreover, a "client" may also refer to an entity, such as a merchant or acquirer that owns, utilizes, and/or operates a client device for initiating transactions with a transaction service provider.

As used herein, the term "server" may refer to or include one or more computing devices, such as processors, storage devices, and/or similar computer components that communicate with client devices and/or other computing devices over a network environment, such as the internet or private networks, and, in some examples, facilitate communication among other servers and/or client devices. It will be appreciated that various other arrangements are possible. As used herein, the term "system" refers to one or more computing devices or combinations of computing devices, such as but not limited to processors, servers, client devices, software applications, and/or other like components.

Non-limiting embodiments of the present disclosure are directed to a system, method, and computer program product for maintaining transaction integrity for transactions performed over public networks. Non-limiting embodiments of the disclosure allow clients to transmit transaction messages from a client device to a transaction service provider over a public network, such as a public internet connection, while maintaining transaction integrity. In non-limiting embodiments, client devices provide and/or generate a unique identifier when submitting a transaction, such that the unique identifier can later be used in reference to the transaction being submitted to allow transaction integrity to be maintained. This arrangement improves current transaction processing systems in which a unique identifier is not associated with a transaction until a transaction request is received by a remote server. The improved arrangement provided by non-limiting embodiments allows for the client device to submit follow-on messages corresponding to an original transaction that can be matched to the original transaction to maintain transaction integrity. In existing payment processing systems, by contrast, a client device is unable to submit follow-on messages that can be easily acted upon by the transaction service provider unless and until receiving a unique identifier to correlate the follow-on messages with the original transaction. An augmenting action may be performed by the transaction service provider to augment data submitted regarding a transaction so that the client needs to only submit reduced specifications for each transaction.

Referring to FIG. 1, a system 100 for maintaining transaction integrity for transactions conducted over a public network is shown according to some non-limiting embodiments or aspects. In the system 100 in FIG. 1, non-limiting embodiment or aspect is shown in which a client system 11 including a client device 14 communicates with a transaction processing server 18 of a transaction service provider 15 over the internet 16. The client device 14 may communicate with the transaction processing server 18 to further process a transaction. In this non-limiting embodiment or aspect, the client system 11 may be any entity or entities arranged between the consumer 10 and the transaction processing server 18. In non-limiting embodiments, the client system 11 may include a merchant system, such as a merchant POS system, an acquirer server of an acquirer, a mobile device of a consumer 10, a payment facilitator server of a payment facilitator, such as but not limited to a payment gateway, and/or any combination thereof. According to the non-limiting embodiment or aspect shown in FIG. 1, a consumer 10 may initiate a transaction with a client system 11 having the client device 14. The transaction may be a transaction in exchange for goods and/or services provided by a merchant. The transaction may be initiated using a portable financial device held by the consumer 10 and accepted by the client system 11. In some non-limiting embodiments or aspects, the transaction may be a purchase of goods and/or services by the consumer 10 from a merchant using a credit card, debit card, and/or electronic wallet application accepted by the client system 11. For instance, the transaction may be conducted between the consumer 10 and the client system 11 at a merchant brick-and-mortar location, on a merchant website, or via a smartphone application of the merchant. However, it will be appreciated that the consumer 10 and/or the client system 11 may initiate the transaction through any suitable channel.

With continued reference to FIG. 1, the client device 14 of the client system 11 may communicate transaction messages to one or more transaction service providers 15 (e.g., transaction processing servers 18 of transaction service providers 15). In some non-limiting embodiments or aspects, the client device 14 may include a device that is part of a merchant system, such as a merchant POS system. In some non-limiting embodiments or aspects, the client device 14 may be a device that is part of an acquirer system of an acquirer, such as an acquirer server. In some non-limiting embodiments or aspects, the client device 14 may include a device that is part of a system of some other payment facilitator operating between the consumer 10 and the transaction processing server 18, such as a payment gateway. In further non-limiting embodiments, the client device 14 may include a mobile device operated by the consumer 10. The client device 14 may process transactions initiated using a consumer's portable financial device by generating a transaction message and communicating it to the transaction processing server 18 to facilitate processing of the transaction, such as for authorization, clearing, and settlement of the transaction. The transaction may be authorized by communicating transaction data to an acquirer server to request that the sale be permitted to proceed. The authorization request may be transmitted from the transaction processing server 18 and/or the transaction service provider 15 to an issuer server 20 of an issuer, to ultimately authorize or deny the transaction. The settlement may be cleared by an acquirer server collecting a number of transactions sent from a merchant system, such as all transactions for a particular day or other time period, and submitting those transactions to the appropriate issuer server 20. The issuer server 20, after subtracting out any fees, communicates the transaction value associated with the transactions it received from the acquirer server to the acquirer server and debits each consumer account corresponding to the transactions accordingly. The transaction may be settled by the acquirer subtracting out its fees from the transaction value it receives from the acquirer server and communicating and/or allocating the remainder to the merchant system.

With continued reference to FIG. 1, the client device 14 may communicate transaction messages corresponding to an original transaction (such as a transaction between the client system 11 and the consumer 10). The transaction message may be communicated over a public network 16, such as a public internet connection 16 (hereinafter "internet"). The transaction message may be communicated over the internet 16 using an Application Programming Interface (API) provided by the transaction processing server 18. The API may be a representational state transfer (REST) API provided by the transaction processing server 18, although it will be appreciated that various interfaces may be used. The client device 14 may access the API using any means, such as using a website or mobile application. Various custom applications and/or systems developed and/or offered by the client system 11, the transaction processing server 18, and/or issuer server 20 may utilize the APIs to facilitate transactions. Since the transaction message may be communicated over the internet 16, specialized hardware for communicating transaction messages over a private network may not be needed.

With continued reference to FIG. 1 the transaction processing server 18 may communicate with an issuer server 20 and/or an acquirer server in connection with the transaction message received from the client device 14. The transaction processing server 18 may communicate with the issuer server 20 for processing the original transaction corresponding to the transaction message. The transaction processing server 18 may communicate with the acquirer server to communicate settlement reports and other processed or unprocessed data associated with processing the original transaction corresponding to the transaction message 24.

Figure 2:
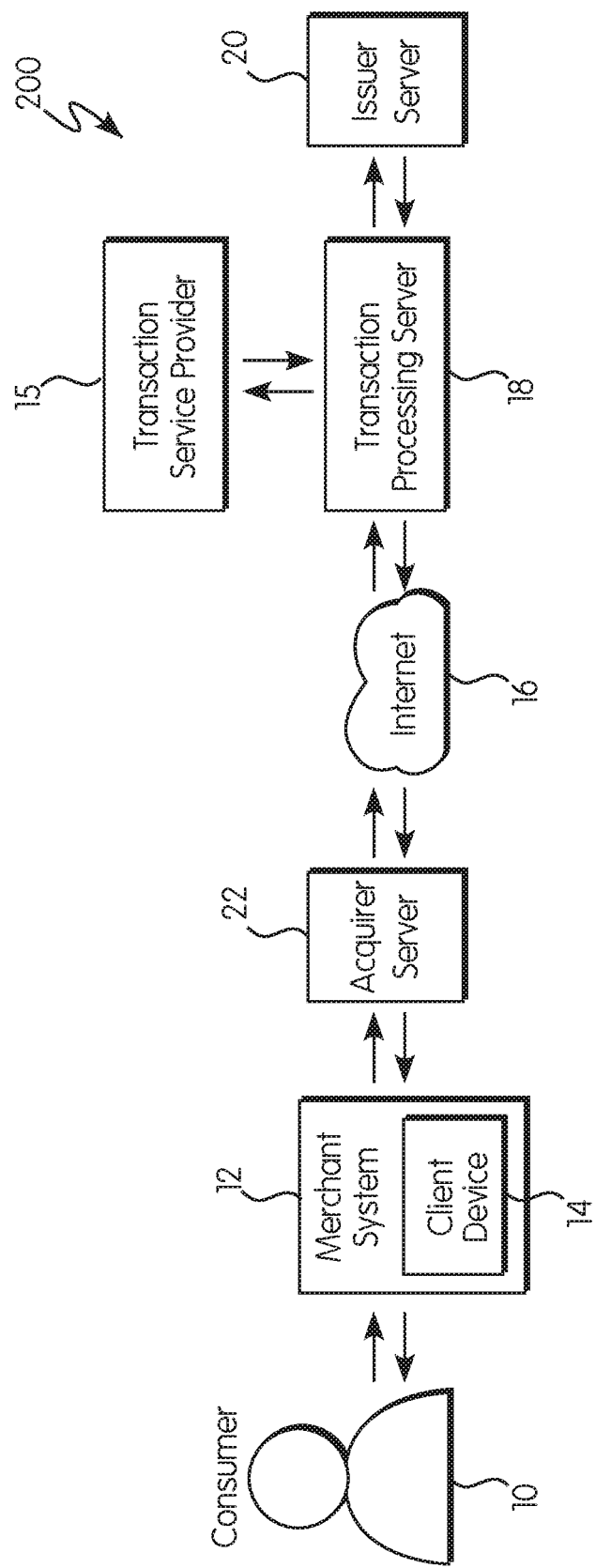
FIG. 2 is another schematic diagram of a non-limiting embodiment or aspect of a system for maintaining transaction integrity for transactions performed over a public network.

Referring to FIG. 2, a system 200 for maintaining transaction integrity for transactions conducted over a public network is shown according to a non-limiting embodiment or aspect. The components of the system 100 in FIG. 1 include all of the capabilities and characteristics of the components from the system 200 of FIG. 2 having like reference numbers. The system 200 of FIG. 2 is an example of a non-limiting embodiment or aspects of the system 100 described in FIG. 1.

According to the non-limiting embodiment or aspect shown in FIG. 2, the client system 11 shown in FIG. 1 may include at least a merchant system 12 having the client device 14 (e.g., a merchant POS device) and an acquirer server 22. The client device 14 may communicate with the consumer 10 to complete a transaction between the consumer 10 and the merchant. The transaction may be initiated using a portable financial device held by the consumer 10 and accepted by the merchant. In some non-limiting embodiments or aspects, the transaction may be a purchase of goods and/or services by the consumer 10 from the merchant using a credit card, debit card, and/or electronic wallet application accepted by the client device 14. For instance, the transaction may be conducted at a merchant brick-and-mortar location, on a merchant website, or via a smartphone application of the merchant. However, it will be appreciated that the consumer 10 and the client device 14 may initiate the transaction through any suitable channel.

The client device 14 of the merchant system 12 may communicate with the acquirer server 22. The acquirer server 22 may communicate with the transaction processing server 18 for processing transactions of the merchant. In some non-limiting embodiments or aspects, the client device 14 may communicate directly with the transaction processing server 18 for processing transactions of the merchant. The client device 14 may communicate with the transaction processing server 18 over the internet 16, as described in connection with the system 100 in FIG. 1.

Figure 3:
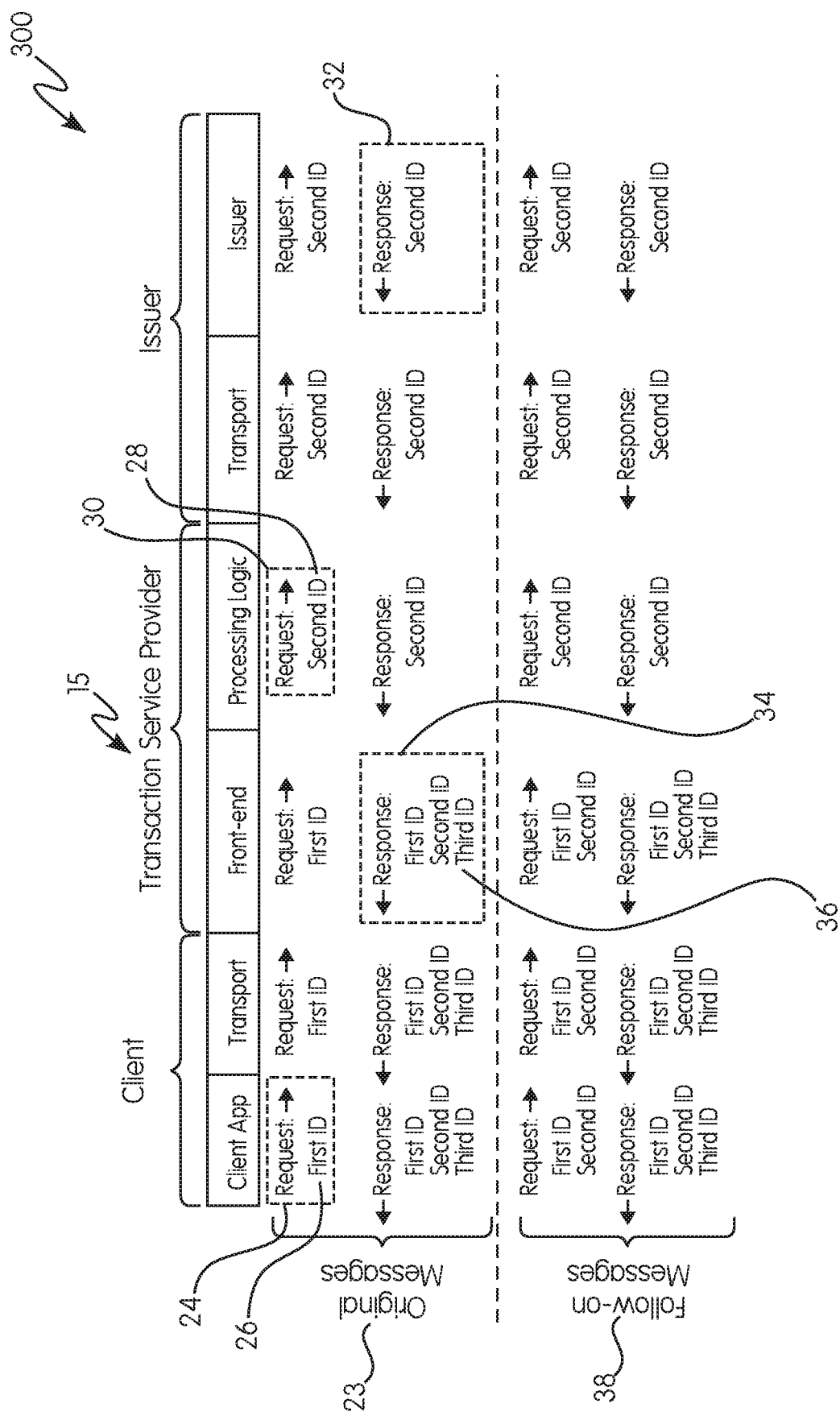
FIG. 3 is a message flow diagram of a non-limiting embodiment or aspect of a method for maintaining transaction integrity for transactions performed over a public network.

Referring to FIG. 3, a message flow diagram 300 for maintaining transaction integrity for transactions conducted over a public network is shown according to a non-limiting embodiment or aspect. An original message 23 in the form of a transaction message 24 may be transmitted from the client device 14 to the transaction service provider 15. As shown in FIG. 3, the client device 14 includes a client application for generating the transaction message 24 and a transport layer for communicating the transaction message 24. The transaction service provider 15 provides and/or supports a front-end application and processing logic. For example, a transaction processing server (not shown in FIG. 3) operated by or on behalf of the transaction service provider 15 may include a front-end application for communicating with the client device 14 and processing logic for communicating with the issuer server 20. It will be appreciated, however, that various arrangements of the client device 14 and transaction processing server are possible.

As used herein, the term "original message" may refer to the first message associated with an interaction, such as the first message associated with a specific transaction or a group of transactions. The transaction message 24 may be a message that includes data corresponding to a specific original transaction or group of transactions. The transaction message 24 may be a payment request. The data included in the transaction message 24 may include data relevant for processing the transaction, and this data may include, for example: consumer name, consumer's portable financial device account identifier (e.g., 16 digit PAN), goods and/or services purchased, type of goods and/or services purchased, quantity of goods and/or services purchased, barcode data and/or unique identifier(s) corresponding to the goods and/or services purchased, merchant name, merchant identification number, merchant address and other contact information, location of sale, point-of-sale details, acquirer details (e.g., acquirer bank identification number (BIN)), and the like. The information contained in the transaction message 24 may include the information required to process the transaction.

With continued reference to FIG. 3, the transaction message 24 may be communicated from the client device 14 to the transaction service provider 15, such as to the transaction processing server. As described herein, the transaction message 24 may be sent to the transaction service provider 15 over a public internet connection, as opposed to over a private connection, for ease of use to the client device 14. The transaction message 24 corresponding to the original transaction may include a first identifier 26 (e.g., a correlation identifier). The first identifier 26 may be generated and/or assigned before the transaction message 24 is communicated to the transaction service provider 15. The first identifier 26 may be generated and/or assigned by the merchant system 12 and/or the client device 14. The first identifier 26 may be a unique, client-assigned identifier. The first identifier 26 may be in any form, such as an alphanumeric combination or any combination of characters and/or symbols. The first identifier 26 generated and/or assigned by the client device 14 to a first transaction may be different from the first identifier 26 assigned to a prior or subsequent transaction from the client device 14. For example, the client device 14 may assign the first identifier 26 to a transaction such that no other transaction the client device 14 communicates in a transaction message 24 has the identical first identifier 26. This allows the client device 14 and/or the transaction service provider 15 to identify a particular transaction from the client device 14 using the first identifier 26, in some cases without any additional data. In addition, the first identifier 26 being assigned to the transaction before being sent to the transaction service provider 15 advantageously provides the client device 14 with a unique identifier in the case that the transaction service provider 15 has not responded yet to the transaction message 24 with any other identifier for the original transaction corresponding to the transaction message 24.

With continued reference to FIG. 3, in response to receiving the transaction message 24, the transaction service provider 15 may assign a unique, second identifier 28 (e.g., a transaction identifier) to the original transaction. The second identifier 28 may be generated and/or assigned by the transaction service provider 15 after receipt of the transaction message 24 from the client device 14 and after the client device 14 has generated and/or assigned the first identifier 26. The second identifier 28 may be a unique, transaction service provider-assigned identifier. The second identifier 28 may be in any form, such as an alphanumeric combination or any combination of characters and/or symbols. The transaction service provider 15, in response to generating and/or assigning the second identifier 28, may associate the first identifier 26 and second identifier 28 in a database to correlate the two identifiers. The second identifier 28 assigned to a first transaction may be different from the second identifier 28 assigned to a prior or subsequent transaction from the client device 14 sending the transaction message 24 or any other client device of the transaction service provider 15. For example, the transaction service provider 15 may assign the second identifier 28 to a transaction such that no other transaction received by the transaction service provider 15 from any client device, ever or during a predetermined time period, has the identical second identifier 28. This allows the client device 14 and/or the transaction service provider 15 to identify a particular transaction using the second identifier 28, in some cases without any additional data.

Still referring to FIG. 3, the transaction service provider 15 may generate a request 30 corresponding to the transaction message 24 to process the original transaction. The request 30 may include the second identifier 28. The request 30 may also include at least a portion of the transaction message 24 received from the client device 14. The portion of the transaction message 24 included in the request 30 may include information required to further process the original transaction and may include any of the information previously described in the transaction message 24. The request 30 may include information required by the issuer server 20 to process the original transaction. The request 30 may be transmitted from the transaction to the issuer server 20. The request may be transmitted to the issuer server 20 using any means, such as over a private connection or any other secure means. For example, the private connection may be transmitted according to International Organization for Standardization (ISO) 8583 message protocol.

With continued reference to FIG. 3, in response to receiving the request 30, the issuer server 20 may process the request 30 (e.g., authorize, clear, and/or settle the original transaction). Once the issuer server 20 has processed the request 30, the issuer server 20 may generate a first response 32 in connection with the original transaction. This first response 32 may include a result of processing the original transaction, such as the original transaction being approved or declined. The first response 32 generated by the issuer server 20 and transmitted to the transaction service provider 15 may include the unique second identifier 28 of the transaction service provider 15, which was included in the request 30. The first response 32 may be transmitted to the transaction service provider 15 using any means, such as over a private connection or any other secure method.

Still referring to FIG. 3, in response to receiving the first response 32, the transaction service provider 15 may generate a second response 34 corresponding to the original transaction. The second response 34 may be in real-time, relative to the transaction message 24. The second response 34 may include at least a portion of the first response 32. The second response 34 may also include the first identifier 26 and the second identifier 28 corresponding to the original transaction. The second response 34 may also include a unique, third identifier 36 (e.g., a request identifier). The third identifier 36 may be generated and/or assigned by the transaction service provider 15 after receipt of the first response 32 from the issuer server 20 and before transmitting the second response 34 to the client device 14. The third identifier 36 may be a unique, transaction service provider-assigned identifier. The third identifier 36 may be in any form, such as an alphanumeric combination or any combination of characters and/or symbols. The transaction service provider 15, in response to generating and/or assigning the third identifier 36, may associate the third identifier 36 with the first identifier 26 and/or second identifier 28 in a database to correlate the three identifiers. The third identifier 36 assigned to a second response 34 may be different from the third identifier 36 assigned to a prior or subsequent second response 34 for the corresponding client device 14 or any other client of the transaction service provider 15. For example, the transaction service provider 15 may assign the third identifier 36 to one message corresponding to a transaction such that no other message of any other transaction has the identical third identifier 36. This allows the client device 14 and/or the transaction service provider 15 to identify a particular second response 34 between the client device 14 and the transaction service provider 15 using the third identifier 36, in some cases without any additional data.

With continued reference to FIG. 3, the second response 34 may be transmitted to the client device 14. The second response 34 may provide information to the client device 14 regarding processing of the original transaction, such as approval or decline of the original transaction. The second response 34 may include identical information from that included in the first response 32 or may change the information into a different format from that included in the first response 32. The second response 34 may be sent to the client device 14 over the public internet connection, as opposed to over a private connection, for ease of use to the client device 14.

With continued reference to FIG. 3, a follow-on message 38 may be communicated from the client device 14 to the transaction service provider 15 regarding the original transaction. A follow-on message 38 may be any message corresponding to an original transaction that follows (in time) the corresponding original message 23. It will be appreciated that multiple follow-on messages 38 may be communicated from the client device 14 to the transaction service provider 15 as needed to process the transaction. The follow-on message 38 may be sent to the transaction service provider 15 over a public internet connection, as opposed to over a private connection, for ease of use to the client device 14. The follow-on message 38 may be communicated from the client device 14 to the transaction service provider 15 to: check the status of processing of the original transaction, provide a reversal message (e.g., reverse the original transaction or indicate a refund issued corresponding to the original transaction), provide a completion message (e.g., indicate completion of the original transaction, indicate shipment of the goods and/or services corresponding to the original transaction, indicate consumer receipt of the goods and/or services corresponding to the original transaction), or any other action or request associated with the original transaction. The follow-on message 38 may include the first identifier 26 and/or the second identifier 28 previously assigned to the original transaction.

With continued reference to FIG. 3, the client device 14 may communicate the follow-on message 38 to the transaction service provider 15. The transaction service provider 15 may use the first identifier 26 and/or the second identifier 28 to associate the follow-on message 38 with the original transaction. This allows the transaction service provider 15 to maintain integrity of the processing of the original transaction such that all communications between the client device 14, the transaction service provider 15, and the issuer server 20 corresponding to the original transaction are matched, compiled, and managed so that the original transaction is accurately and securely processed.

With continued reference to FIG. 3, communications between the client device 14, the transaction service provider 15, and the issuer server 20 may be conducted as previously described. However, a new first identifier 26 or a new second identifier 28 may not be generated because the first identifier 26 and the second identifier 28 from the original transaction are still available to preserve transaction integrity. For subsequent communications corresponding to follow-on messages 38 sent by the transaction service provider 15 to the client device 14, a new third identifier 36 may be generated for the new message such that each message sent from the transaction service provider 15 to the client device 14 has a unique third identifier 36. For example, the third identifier 36 corresponding to an original message 23 associated with a first transaction may be "abc123". If a first follow-on message associated with the first transaction is sent by the client device 14 and the transaction service provider 15 returns a response, that response may be assigned a new third identifier 36, which may be "abc124". If a second follow-on message associated with the first transaction is sent by the client device 14 and the transaction service provider 15 returns a response, that response may be assigned a new third identifier 36, which may be "abc125". Assigning a new third identifier 36 for each new message communicated form the transaction service provider 15 to the client device 14 may help to preserve integrity of the transaction by uniquely identifying each communication separately. It will be appreciated that each communication, such as a response, sent from the transaction service provider 15 to the client device 14 may include the first identifier 26 and/or the second identifier 28, which may remain the same throughout the life cycle of the original transaction in order to preserve transaction integrity.

In some non-limiting embodiments or aspects, and with continued reference to FIG. 3, the follow-on message 38 may be transmitted from the client device 14 to the transaction service provider 15 before the second response 34 corresponding to the original message 23 is communicated from the transaction service provider 15 to the client device 14. For example, the client device 14 may send an original message 23 and a corresponding follow-on message 38 for the same original transaction before any communication is received back from the transaction service provider 15. In this scenario, both the original message 23 and the follow-on message 38 may include the same first identifier 26, which allows the transaction service provider 15 to associate the original message 23 with the follow-on message 38. This also allows the client device 14 to be able to follow up with a transaction service provider 15 before receiving any response from the transaction service provider 15 that includes a transaction service provider-assigned identifier (e.g., a second identifier 28). In other non-limiting embodiments, the follow-on message 38 may be transmitted from the client device 14 to the transaction service provider 15 after the second response 34 corresponding to the original message 23 is communicated from the transaction service provider 15 to the client device 14.

Figure 4A:
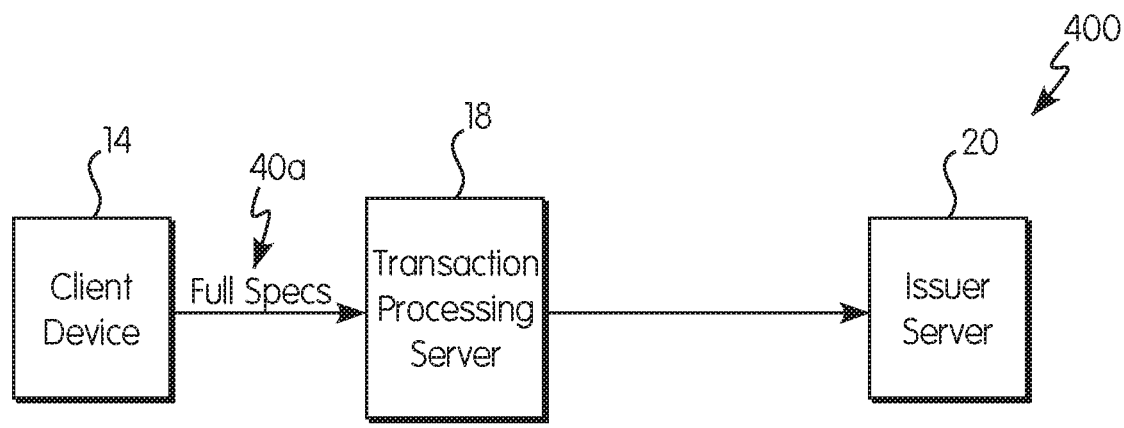
FIG. 4A is a schematic diagram of a non-limiting embodiment or aspect of a system for communicating transaction specifications to a transaction service provider.

Referring to FIG. 4A, a non-limiting embodiment or aspect of a system 400 for communicating transaction specifications to a transaction service provider is shown. As previously mentioned, in some non-limiting embodiments or aspects, the client device 14 may communicate with the transaction processing server 18 in order to process an original transaction. This communication may occur, for instance, over a public internet connection, while still securely and accurately maintaining transaction integrity. In order to process the original transaction, the client device 14 may communicate data corresponding to the original transaction to the transaction processing server 18, such as in a transaction message 24, as previously described. The client device 14 may communicate full specifications 40*a* (hereinafter "full specs") corresponding to the original transaction, which may include all available and/or relevant data for processing the original transaction. These full specs 40*a* may include, for example, the following transaction parameters: consumer name, consumer's portable financial device account identifier (e.g., 16 digit PAN), goods and/or services purchased, type of goods and/or services purchased, quantity of goods and/or services purchased, barcode data and/or unique identifier(s) corresponding to the goods and/or services purchased, merchant name, merchant identification, merchant category, merchant address and other contact information, location of sale, point of sale details, acquirer details (e.g., acquirer bank identification number (BIN)), and/or the like corresponding to the original transaction. It will be appreciated that other parameters regarding the original transaction may be included in the full specs 40*a*, as the above list is non-limiting. The transaction processing server 18 may communicate at least some of the full specs 40*a* to the issuer server 20 for further processing of the original transaction.

Figure 4B:
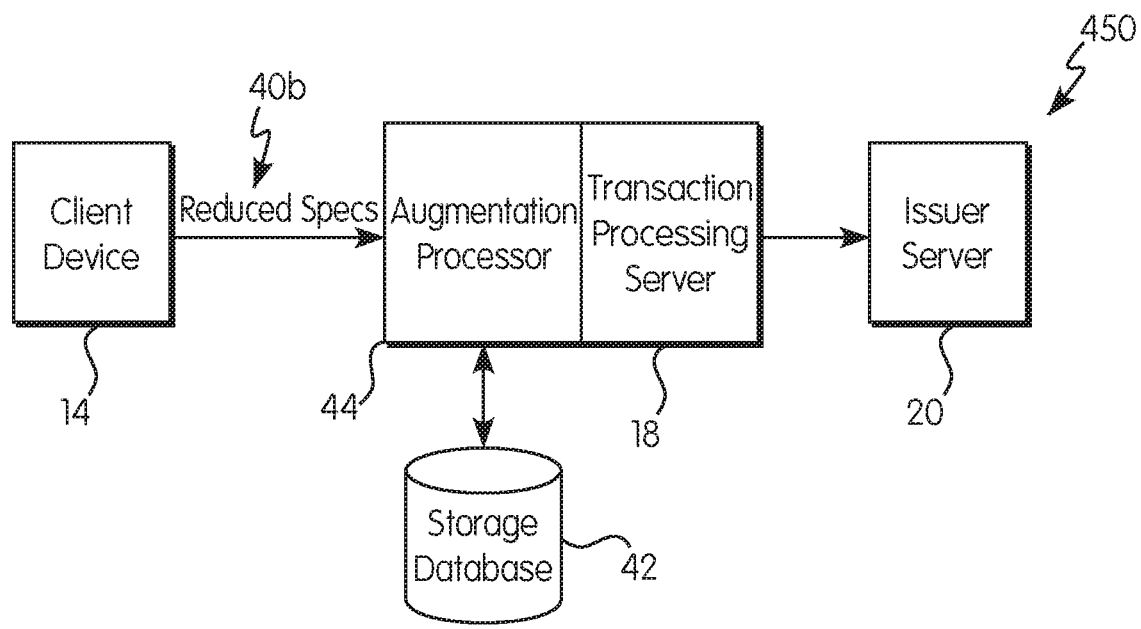
FIG. 4B is a schematic diagram of a non-limiting embodiment or aspect of a system for augmenting transaction specifications submitted to a transaction service provider.

With reference to FIG. 4B, a non-limiting embodiment or aspect of a system 450 for augmenting transaction specifications submitted to a transaction service provider is shown. In some non-limiting embodiments or aspects, the client device 14 may not be required to communicate the full specs 40*a* to the transaction processing server 18 in order for processing of the original transaction. Instead, in some non-limiting embodiments or aspects, the client device 14 may communicate only reduced specs 40*b* to the transaction processing server 18 in order to further process the original transaction. As used herein, the term "reduced specs" may refer to some subset of transaction parameters of the full specs, but not all of the data included in the full specs. For example, in non-limiting embodiments, the reduced specs 40*b* may include only the data from the client device 14 that may be variable from transaction to transaction. Using only reduced specs 40*b* provided by the client device 14 is advantageous because it eases the burden on the client device 14 by requiring less data be communicated to the transaction processing server 18 in order to process an original transaction.

Still referring to FIG. 4B, in order to process transactions using only reduced specs 40*b* provided by the client device 14, the transaction service provider may store data, such as transaction parameters, in a storage database 42. For example, the data may include transaction parameters from the full specs 40*a* that may not change from transaction to transaction. The data stored in the storage database 42 may be communicated from the client device 14 to the storage database 42 separate from any transaction, such as at the initiation of a business relationship between a merchant and the transaction service provider 15. The data stored in the storage database 42 may be communicated from the client device 14 to the storage database 42 during the first original transaction communicated by the client device 14 to the transaction processing server 18 (e.g., using full specs 40*a*), such that the relevant data is extracted from that first original transaction and stored in the storage database 42. The data from the storage database 42 may then be used for each transaction communicated from the client device 14 to the transaction processing server 18 after the first original transaction (e.g., using reduced specs 40*b*).

With continued reference to FIG. 4B, original transactions may be processed using only reduced specs 40*b* corresponding to the original transaction using an augmentation processor 44. The augmentation processor 44 may be a separate processor from the transaction processing server 18 or, in other embodiments, the transaction processing server 18 may act as the augmentation processor 44. The augmentation processor 44 may be hosted by or on behalf of the transaction service provider 15. To process an original transaction, the augmentation processor 44 may receive reduced specs 40b corresponding to an original transaction. The augmentation processor 44, in response to receiving the reduced specs 40b, may query the storage database 42 to identify corresponding transaction parameters to augment the reduced specs 40b with. In some non-limiting embodiments or aspects, the data provided by the storage database 42 to augment the reduced specs 40b may include merchant name, merchant identifier, merchant classification, merchant address and other contact information, location of sale, point-of-sale details, acquirer details, and other details that do not change from transaction to transaction. The reduced specs 40b may include the transaction parameters that may change from transaction to transaction, such as consumer's portable financial device account identifier, goods and/or services purchased, type of goods and/or services purchased, quantity of goods and/or services purchased, and/or barcode data or other unique identifier(s) corresponding to the goods and/or services purchased. The augmentation processor may augmenting the reduced specs 40b by generating a transaction message having full specs 40a, either as a new transaction message or a modified transaction message. The augmentation processor 44 may communicate all or some subset of the reduced specs 40b and the transaction parameters from the storage database 42, all of which may correspond to the original transaction, to the transaction processing server 18 separately or combined into a transaction message. The transaction processing server 18 may communicate at least some of this data from the augmentation processor 44 to the issuer server 20 for further processing of the original transaction.

Figure 5:
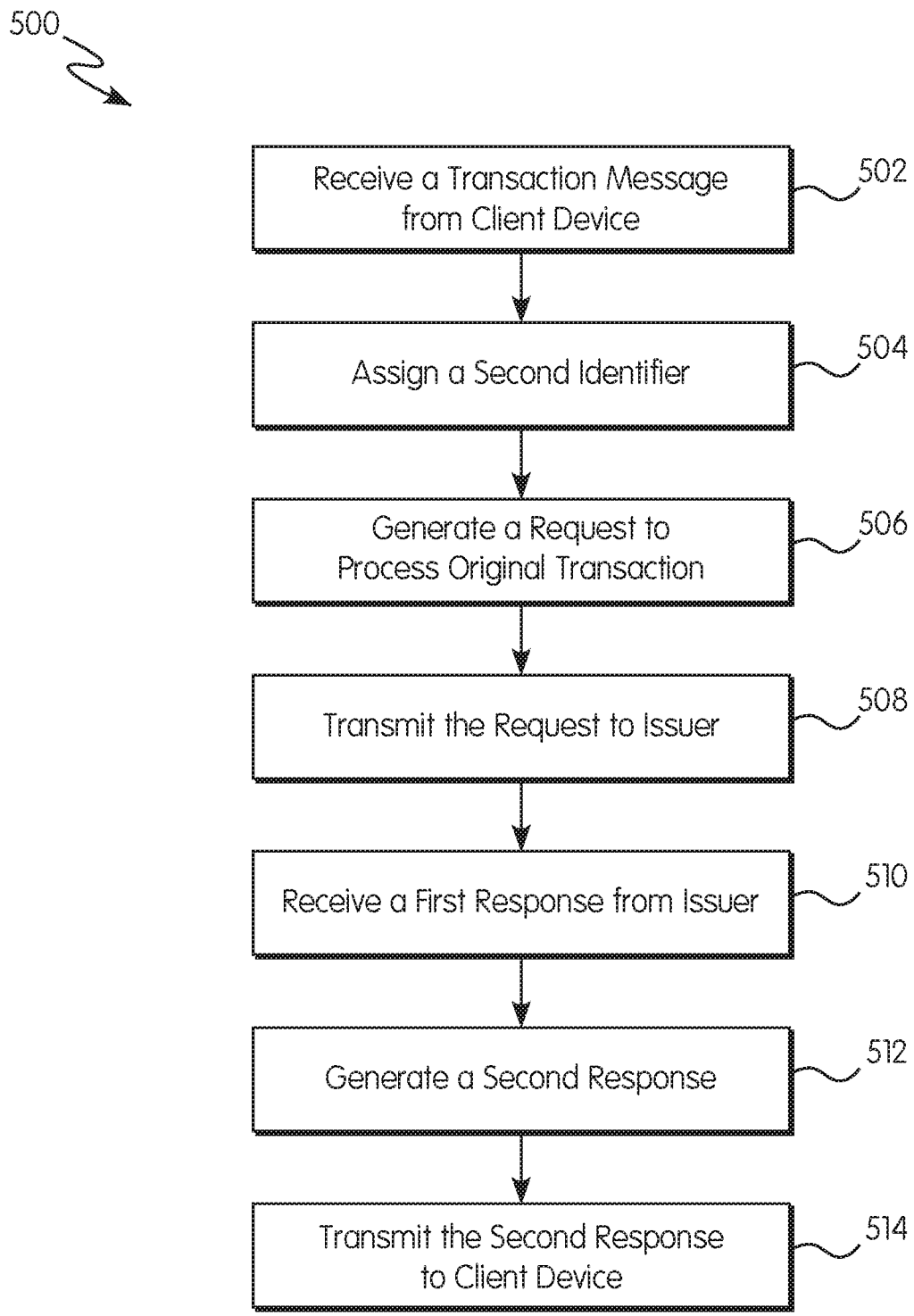
FIG. 5 is a step diagram of a non-limiting embodiment or aspect of a method for maintaining transaction integrity for transactions performed over a public network.

Referring to FIG. 5, a non-limiting embodiment or aspect of a method 500 for maintaining transaction integrity for transactions conducted over a public network is shown. At a step 502 the transaction processing server 18 may receive the transaction message 24 from the client device 14. The transaction message 24 may correspond to an original transaction between a merchant system 12 and a consumer 10. The transaction message 24 sent from the client device 14 to the transaction processing server 18 may include the unique, client-assigned first identifier 26. The first identifier 26 may allow the client device 14 and/or the transaction service provider 15 to identify each transaction communicated to the transaction processing server 18. The transaction message 24 may include full specs 40a or reduced specs 40b. The transaction message may be communicated to the transaction processing server 18 over the internet 16.

Referring to FIG. 5, a non-limiting embodiment of a method 500 for maintaining transaction integrity for transactions conducted over a public network is shown. At a step 502 the transaction processing server 18 may receive the transaction message 24 from the client device 14. The transaction message 24 may correspond to an original transaction between a merchant system 12 and a consumer 10. The transaction message 24 sent from the client device 14 to the transaction processing server 18 may include the unique, client-assigned first identifier 26. The first identifier 26 may allow the client device 14 and/or the transaction service provider 15 to identify each transaction communicated to the transaction processing server 18. The transaction message 24 may include full specs 40a or reduced specs 40b. The transaction message may be communicated to the transaction processing server 18 over the internet 16.

With continued reference to FIG. 5, at a step 504, the transaction processing server 18 may assign the unique second identifier 28 to the original transaction. This may be done in response to receiving the transaction message 24 from the client device 14, and the second identifier 28 may be different from the first identifier 26. The second identifier 28 may allow the client device 14 and/or the transaction service provider 15 to identify each transaction communicated to the transaction processing server 18. At a step 506, the transaction processing server 18 may generate a request 30 to process the original transaction. The request 30 may include at least a portion of the transaction message 24 required to further process the original transaction. The request may also include the second identifier 28. At a step 508, the transaction processing server 18 may transmit the request 30 to the issuer server 20. The request 30 may be communicated to the issuer server 20 using any secure means, such as over a secure private connection.

With continued reference to FIG. 5, in response to receiving the request 30, the issuer server 20 may process the request 30 corresponding to the original transaction and generate and communicate the first response 32. At a step 510, the transaction processing server 18 receives the first response 32 communicated by the issuer server 20. The first response 32 may be communicated to the transaction processing server 18 using any secure means, such as over a secure private connection. The first response 32 may include the second identifier 28, which was provided to the issuer server 20 in the request 30. The first response 32 may correspond to the original transaction, and may indicate whether the original transaction is approved or declined.

With continued reference to FIG. 5, at a step 512, the transaction processing server 18 may generate a second response 34 in response to receiving the first response 32. The second response 34 may correspond to the original transaction and may include at least some of the information contained in the first response 32, such as an indication of whether the original transaction is approved or declined. The second response 34 may include identical information from that included in the first response 32 or may change the information into a different format from that included in the first response 32. The second response 34 may also include the first identifier 26 and the second identifier 28 corresponding to the original transaction. The second response 34 may also include a unique, third identifier 36 assigned by the transaction service provider 15. At a step 514, the transaction processing server 18 may transmit the second response 34 to the client device 14 over the public internet connection.

Figure 6:
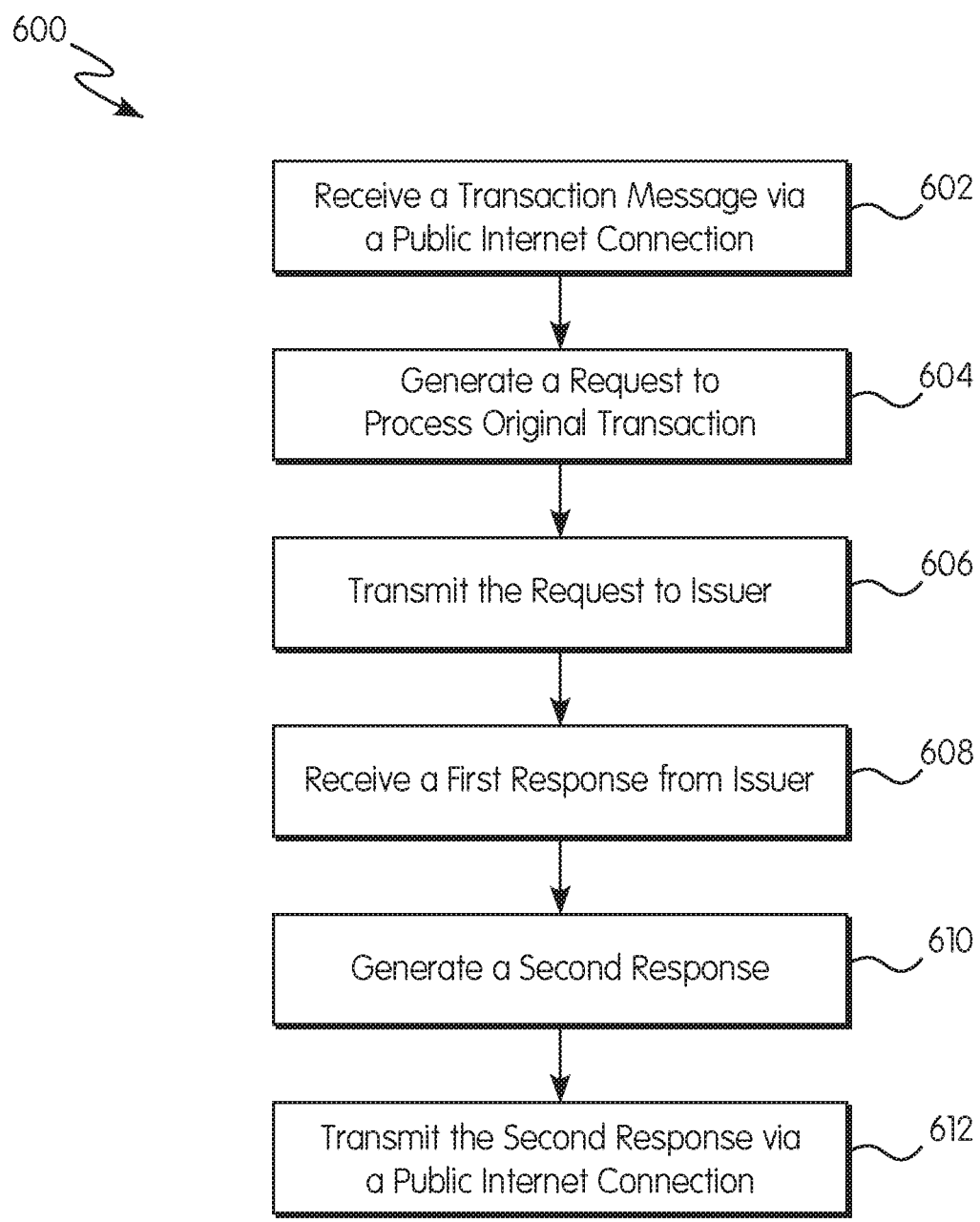
FIG. 6 is another step diagram of a non-limiting embodiments or aspect of a method for maintaining transaction integrity for transactions performed over a public network.

Referring to FIG. 6, a non-limiting embodiment or aspect of a method 600 for maintaining transaction integrity for transactions performed over a public network is shown. At a step 602, the transaction processing server 18 may receive a transaction message 24 from the client device 14 corresponding to an original transaction, and the transaction message may be identical in form and/or content as described in step 502 of method 500 shown in FIG. 5. The transaction message 24 may be communicated from the client device 14 to the transaction processing server 18 via the public internet connection, rather than a private network. At a step 604, the transaction processing server 18 may generate a request 30 to process the original transaction, the request including at least a portion of the original transaction message 24, and this step 604 may be performed in the same manner as step 506 of method 500. At a step 606, the transaction processing server 18 may transmit the request 30 to the issuer server 20 to process the original transaction, and this step 606 may be performed in the same manner as step 508 of method 500. At a step 608, the transaction processing server 18 may receive the first response 32 from the issuer server 20 corresponding to the original transaction, and this step 608 may be performed in the same manner as step 510 of method 500. At a step 610, in response to receiving the first response 32, the transaction processing server 18 may generate the second response 34 corresponding to the original transaction, the second response 34 including the first identifier 26, and this step 610 may be performed in the same manner as step 512 of method 500. At a step 612, the transaction processing server 18 may transmit the second response 34 to the client device 14. The second response 34 may be communicated from the transaction processing server 18 to the client device 14 via the public internet connection.

Figure 7:
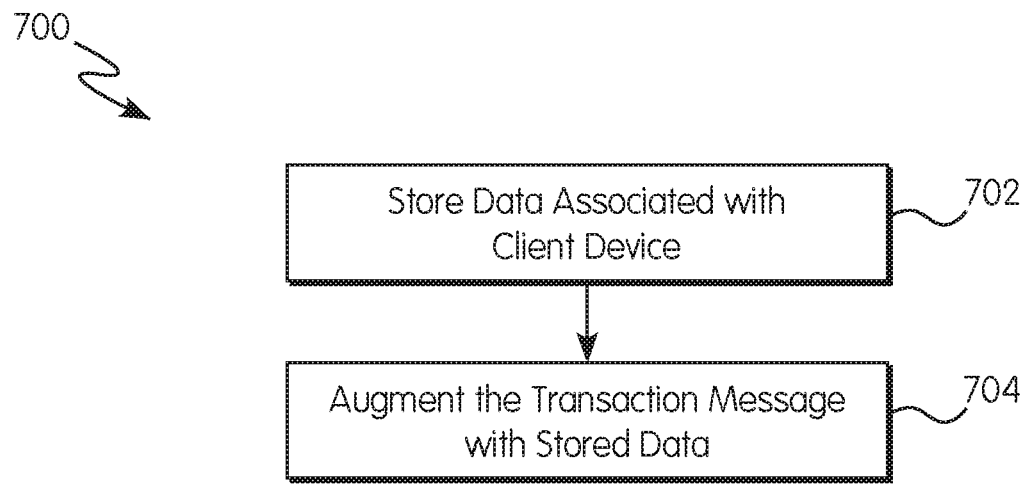
FIG. 7 is a step diagram of a non-limiting embodiment or aspect of a method for augmenting client specifications submitted to a transaction service provider.

Referring to FIG. 7, a non-limiting embodiment or aspect of a method 700 for augmenting transaction specifications submitted to a transaction service provider 15 is shown. At a step 702, the client device 14 may communicate transaction parameters associated with the client device 14 and/or merchant system 12 to be stored in the storage database 42. In some non-limiting embodiments or aspects, the transaction parameters may be communicated to the transaction processing server 18 or other system managed or controlled by or on behalf of the transaction service provider 15 to then be stored in the storage database 42. In some non-limiting embodiments or aspects, the data may be communicated from the client device 14 directly to the storage database 42. The transaction parameters stored and associated with the client device 14 may be transaction parameters that do not change from transaction to transaction. The transaction parameters stored in the storage database 42 may be communicated from the client device 14 to the storage database 42 separate from any transaction, such as at the initiation of a business relationship between the merchant system 12 and the transaction service provider 15. The data stored in the storage database 42 may also be communicated from the client device 14 to the storage database 42 during a first original transaction communicated by the client device 14 to the transaction processing server 18, such that the relevant data is extracted from that first original transaction and stored in the storage database 42. The transaction parameters from the storage database 42 may then be used for each transaction communicated from the client device 14 to the transaction processing server 18 after the first original transaction.

With continued reference to FIG. 7, the client device 14 may communicate the previously described reduced specs 40b to the augmentation processor 44 for processing of the original transaction. At a step 704, the augmentation processor 44 may augment the transaction message 24 including the reduced specs 40b with the data stored in the storage database 42 associated with the client device 14 or with the merchant system 12 associated with the client device 14. The reduced specs 40b may include the transaction parameters that may change from transaction to transaction, such as consumer's portable financial device account identifier, goods and/or services purchased, type of goods and/or services purchased, quantity of goods and/or services purchased, or barcode data and/or unique identifier(s) corresponding to the goods and/or services purchased.

Figure 8:
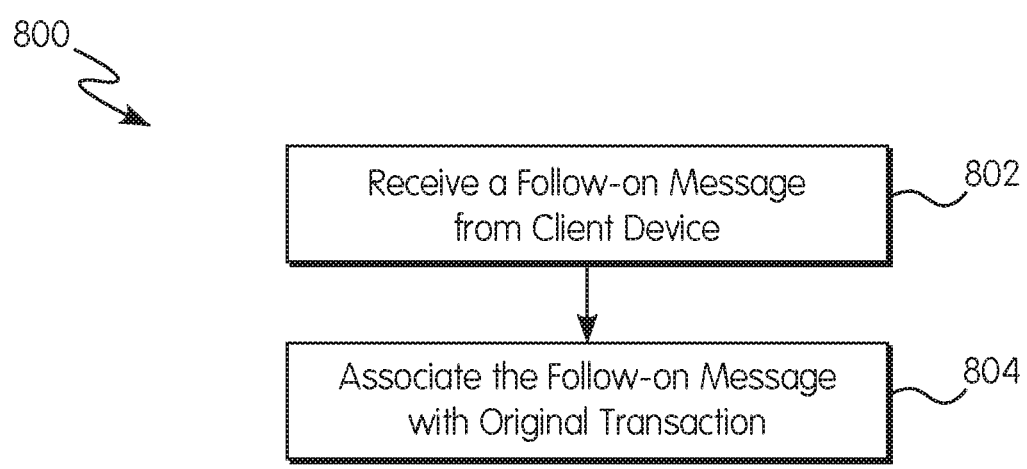
FIG. 8 is a step diagram of a non-limiting embodiment or aspect of a method for associating a follow-on message with an original transaction.

Referring to FIG. 8, a non-limiting embodiment or aspect of a method 800 for associating a follow-on message 38 with an original transaction is shown. As previously described, the client device 14 may communicate the original message 23 as the transaction message 24 to the transaction processing server 18 corresponding to an original transaction. After this original message 23, the client device 14 may communicate one or more follow-on messages 38 to the transaction processing server 18. The follow-on message 38 may be sent to the transaction processing server 18 over a public internet connection, rather than a private network, for ease of use to the client device 14. The follow-on message 38 may be communicated from the client device 14 to the transaction processing server 18 for any for the previously described reasons. The follow-on message 38 may include the first identifier 26 and/or the second identifier 28 previously assigned to the original transaction. At a step 802, the transaction processing server 18 may receive the follow-on message 38 from the client device 14 or the merchant system 12 associated with the client device 14. The follow-on message 38 may be sent to the transaction processing server 18 over a public internet connection. At a step 804, the transaction processing server 18 may associate the follow-on message 38 received with the original transaction. The transaction processing server 18 may use the first identifier 26 and/or the second identifier 28 to associate the follow-on message 38 with the original transaction. This allows the transaction processing server 18 to maintain integrity of the processing of the original transaction such that all communications between the client device 14, the transaction processing server 18, and the issuer server 20 corresponding to the original transaction are matched, compiled, and managed so that the original transaction is accurately and securely processed.

EXAMPLE

The following example is provided to illustrate a non-limiting embodiment or aspect of the system, method, and computer program product for maintaining transaction integrity for transactions conducted over a public network, and is not meant to limit the disclosure in any way.

According to a non-limiting embodiment or aspect, Customer A (e.g., a consumer 10) purchases goods and/or services (e.g., clothing) from Big Box Store (e.g., a merchant) having a Big Box Store POS device (e.g., a merchant system 12). First Acquirer Bank is the acquirer bank having a First Acquirer Bank Server (e.g., acquirer server 22) of Big Box Store; however, in some non-limiting embodiments or aspects, Big Box Store is the acquirer. In this example, Big Box Store is a client, having a client system 11, of First Credit Card Company (e.g., a transaction service provider 15) having a First Credit Card Company Server (e.g., transaction processing server 18). However, in other examples, the acquirer of the merchant (e.g., First Acquirer Bank) is the client, having a client system 11, of First Credit Card Company. In a transaction for the clothing between Customer A and Big Box Store (the original transaction), a Big Box Store POS device (e.g., a client device 14) managed by or on behalf of Big Box Store communicates an original message 23, which is a transaction message 24, as an API call to First Credit Card Company Server. Big Box Store POS device accesses the API using any means, such as using a website or mobile application. Big Box Store develops its own application to interface with First Credit Card Company Server's API. The transaction message 24 includes any of the data previously described that is relevant to processing the original transaction. The transaction message 24 is communicated from Big Box Store POS device to First Credit Card Company Server over a public internet connection, such as using the hypertext transfer protocol (HTTP protocol).

The transaction message 24 includes a unique first identifier 26 assigned by Big Box Store POS device. The transaction message 24 includes full specs 40a, as previously described. Alternatively, the transaction message 24 includes reduced specs 40b, and the storage database 42 of First Credit Card Company Server provides the balance of the relevant data to the augmentation processor of First Credit Card Company (e.g., an augmentation processor 44). All of the relevant data for processing the original transaction is communicated to First Credit Card Company Server. First Credit Card Company Server assigns a unique second identifier 28 to the original transaction in response to receiving the transaction message 24. First Credit Card Company Server generates a request 30 to process the original transaction, and this request 30 includes at least a portion of the transaction message 24 from Big Box Store POS device and the second identifier 28. First Credit Card Company Server then communicates the request 30 to First Issuer Bank Server to further process the original transaction, such as to authorize, clear, and/or settle the original transaction. The request 30 is communicated from First Credit Card Company Server to First Issuer Bank Server using a private connection.

After processing the request 30, First Issuer Bank Server generates a first response 32 to the request, such as authorizing or declining the original transaction. First Issuer Bank Server then communicates the first response 32 to First Credit Card Company Server using the private connection, and the first response includes the second identifier 28. In response to receiving the first response 32, First Credit Card Company Server generates a second response 34 corresponding to the original transaction. The second response 34 includes the first identifier 26 and the second identifier 28, and also includes at least a portion of the first response 32, such as an indication of whether the original transaction is approved or declined. First Credit Card Company Server also assigns a unique, third identifier 36 to include in the second response 34. First Credit Card Company Server then communicates the second response 34 to Big Box Store POS device. The first response 32 from First Issuer Bank Server allows the original transaction between Customer A and Big Box Store POS device to proceed (if approved) or declines the original transaction.

Big Box Store POS device also sends a follow-on message 38 (after the original message 23 in time) to First Credit Card Company Server associated with subsequent activity corresponding to the original transaction. The follow-on message 38 includes the first identifier assigned by Big Box Store POS device in the transaction message 24 (the original message 23). Big Box Store POS device communicates the follow-on message 38 to First Credit Card Company Server for any number of reasons. For example, Big Box Store POS device sends the follow-on message 38 to check the status of processing the original transactions (e.g., in a case in which Big Box Store POS device has not received any response from First Credit Card Company Server). As another example, Big Box Store POS device sends a follow-on message 38 to reverse the original transaction (such as an inadvertently made purchase or a return of the clothing that includes a refund being issued). As another example, Big Box Store POS device sends the follow-on message 38 to provide a completion message to indicate completion of the original transaction, indicate shipment of the goods and/or services corresponding to the original transaction, or indicate consumer receipt of the goods and/or services corresponding to the original transaction. Big Box Store POS device may send First Credit Card Company Server the follow-on message 38 corresponding to the original transaction for any other reason. First Credit Card Company Server associates the follow-on message 38 from Big Box Store POS device with the original transaction, such as using the first identifier 26 and/or the second identifier 28.

The system, method, and computer program product for maintaining transaction integrity for transactions performed over a public network according to the above example allows client devices 14 to transmit transaction messages 24 to the transaction processing server 18 over a public network, such as over the internet 16, while still maintaining transaction integrity. Further, the client-assigned first identifier 26 is later used in reference to the transaction being submitted to allow transaction integrity to be maintained. Further, the client device 14 submits follow-on messages 38 corresponding to an original transaction that can be matched to the original transaction by the transaction processing server 18 to maintain transaction integrity. An augmenting action is performed by the transaction service provider 15 to augment data submitted regarding a transaction so that the client device 14 needs to only submit the reduced spec 40b.

Although the disclosure has been described in detail for the purpose of illustration based on what is currently considered to be the most practical and preferred embodiments, it is to be understood that such detail is solely for that purpose and that the disclosure is not limited to the disclosed embodiments, but, on the contrary, is intended to cover modifications and equivalent arrangements that are within the spirit and scope of the appended claims. For example, it is to be understood that the present disclosure contemplates that, to the extent possible, one or more features of any embodiment can be combined with one or more features of any other embodiment.

The invention claimed is:

1. A method of maintaining transaction integrity for transactions performed over a public network, comprising:
   receiving, from a client device, a transaction message corresponding to an original transaction, the transaction message comprising a unique, client-assigned, first identifier;
   in response to receiving the transaction message, assigning a unique, second identifier to the original transaction;
   generating a request to process the original transaction comprising at least a portion of the transaction message and the second identifier;
   transmitting the request to an issuer server to process the original transaction;
   receiving a first response from the issuer server in connection with the original transaction;
   in response to the first response, generating a second response corresponding to the original transaction, the second response comprising the first identifier and the second identifier;
   transmitting the second response to the client device;
   receiving a follow-on message from the client device, the follow-on message comprising the first identifier, wherein the follow-on message comprises a request and/or action associated with the original transaction;
   analyzing the follow-on message to identify the first identifier and the request and/or action associated with the original transaction;
   based on the identified first identifier, associating the follow-on message with the original transaction; and executing the identified request and/or action associated with the original transaction.

2. The method of claim 1, wherein after receiving the first response, a unique, third identifier is assigned and included in the second response.

3. The method of claim 1, further comprising:
storing data associated with the client device or a merchant or acquirer associated with the client device; and
augmenting the transaction message with the stored data associated with the client device or the merchant associated with the client device.

4. The method of claim 1, wherein the transaction message is received via a public internet connection.

5. The method of claim 1, wherein the first identifier is generated by the client device.

6. The method of claim 1, wherein a plurality of transaction messages are received from the client device, wherein each of the plurality of transaction messages comprises a first identifier, and wherein the first identifier of each transaction message is different from the first identifier of the other transaction messages.

7. The method of claim 1, wherein the request and/or action associated with the original transaction comprises at least one of a reversal message and a completion message.

8. The method of claim 1, wherein each response generated and transmitted to the client device corresponding to the original transaction comprises the first identifier contained in the transaction message corresponding to the original transaction.

9. The method of claim 1, wherein the follow-on message is received and associated with the original transaction before the second response is transmitted to the client device.

10. A system for maintaining transaction integrity for transactions performed over a public network, comprising at least one server computer including at least one processor, the at least one server computer programmed and/or configured to:
receive, from a client device, a transaction message corresponding to an original transaction, the transaction message comprising a unique, client-assigned, first identifier;
in response to receiving the transaction message, assign a unique, second identifier to the original transaction;
generate a request to process the original transaction comprising at least a portion of the transaction message and the second identifier;
transmit the request to an issuer server to process the original transaction;
receive a first response from the issuer server in connection with the original transaction;
in response to the first response, generate a second response corresponding to the original transaction comprising the first identifier and the second identifier;
transmit the second response to the client device;
receive a follow-on message from the client device, the follow-on message comprising the first identifier, wherein the follow-on message comprises a request and/or action associated with the original transaction;
analyze the follow-on message to identify the first identifier and the request and/or action associated with the original transaction;
based on the identified first identifier, associate the follow-on message with the original transaction; and
execute the identified request and/or action associated with the original transaction.

11. The system of claim 10, wherein the at least one server computer is further programmed and/or configured to: after receiving the first response, assign a unique, third identifier and include the third identifier in the second response.

12. The system of claim 10, wherein the at least one server computer is further programmed and/or configured to:
store data associated with the client device or a merchant or acquirer associated with the client device; and
augment the transaction message with the stored data associated with the client device or the merchant associated with the client device.

13. The system of claim 10, wherein the transaction message is received via a public internet connection.

14. The system of claim 10, wherein the first identifier is generated by a client associated with the client device.

15. The system of claim 10, wherein the at least one server computer is further programmed and/or configured to: receive a plurality of transaction messages from the client device, wherein each of the plurality of transaction messages comprises a first identifier, wherein the first identifier of each transaction message is different from the first identifier of the other transaction messages.

16. The system of claim 10, wherein each response generated and transmitted to the client device corresponding to the original transaction comprises the first identifier contained in the transaction message corresponding to the original transaction.

17. The system of claim 10, wherein the at least one server computer is further programmed and/or configured to receive and associate the follow-on message with the original transaction before the second response is transmitted to the client device.

18. A method of maintaining transaction integrity for transactions performed over a public network, comprising:
providing an application programming interface (API) to enable communication with a client device over a public internet connection to process transactions;
receiving, from the client device via the API, a transaction message corresponding to an original transaction via the public internet connection, the transaction message comprising a unique, client-assigned, first identifier;
in response to receiving the transaction message, generating a request to process the original transaction comprising at least a portion of the transaction message;
transmitting the request to an issuer server to process the original transaction;
receiving a first response from the issuer server corresponding to the original transaction;
in response to receiving the first response, generating a second response corresponding to the original transaction comprising the first identifier;
transmitting, to the client device via the API, the second response via the public internet connection;
receiving a follow-on message from the client device via the API, the follow-on message comprising the first identifier, wherein the follow-on message comprises a request and/or action associated with the original transaction;
analyzing the follow-on message to identify the first identifier and the request and/or action associated with the original transaction;
based on the identified first identifier, associating the follow-on message with the original transaction; and
executing the identified request and/or action associated with the original transaction.

19. The system of claim 10, wherein the request and/or action associated with the original transaction comprises at least one of a reversal message and a completion message.

* * * * *